Feb. 8, 1927. 1,616,661
F. KEYSE
TRAP NEST
Filed Aug. 24, 1925  2 Sheets-Sheet 1
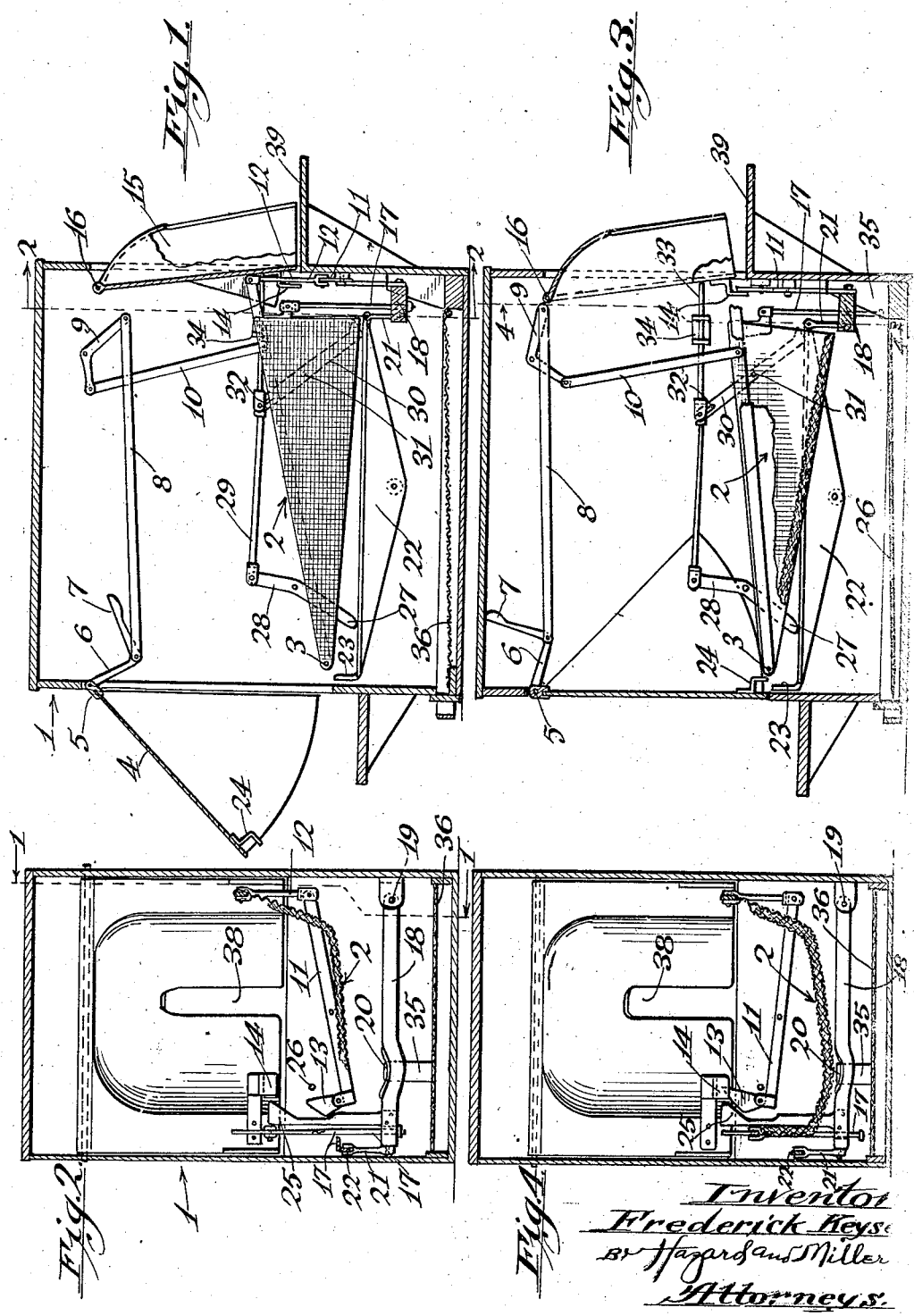

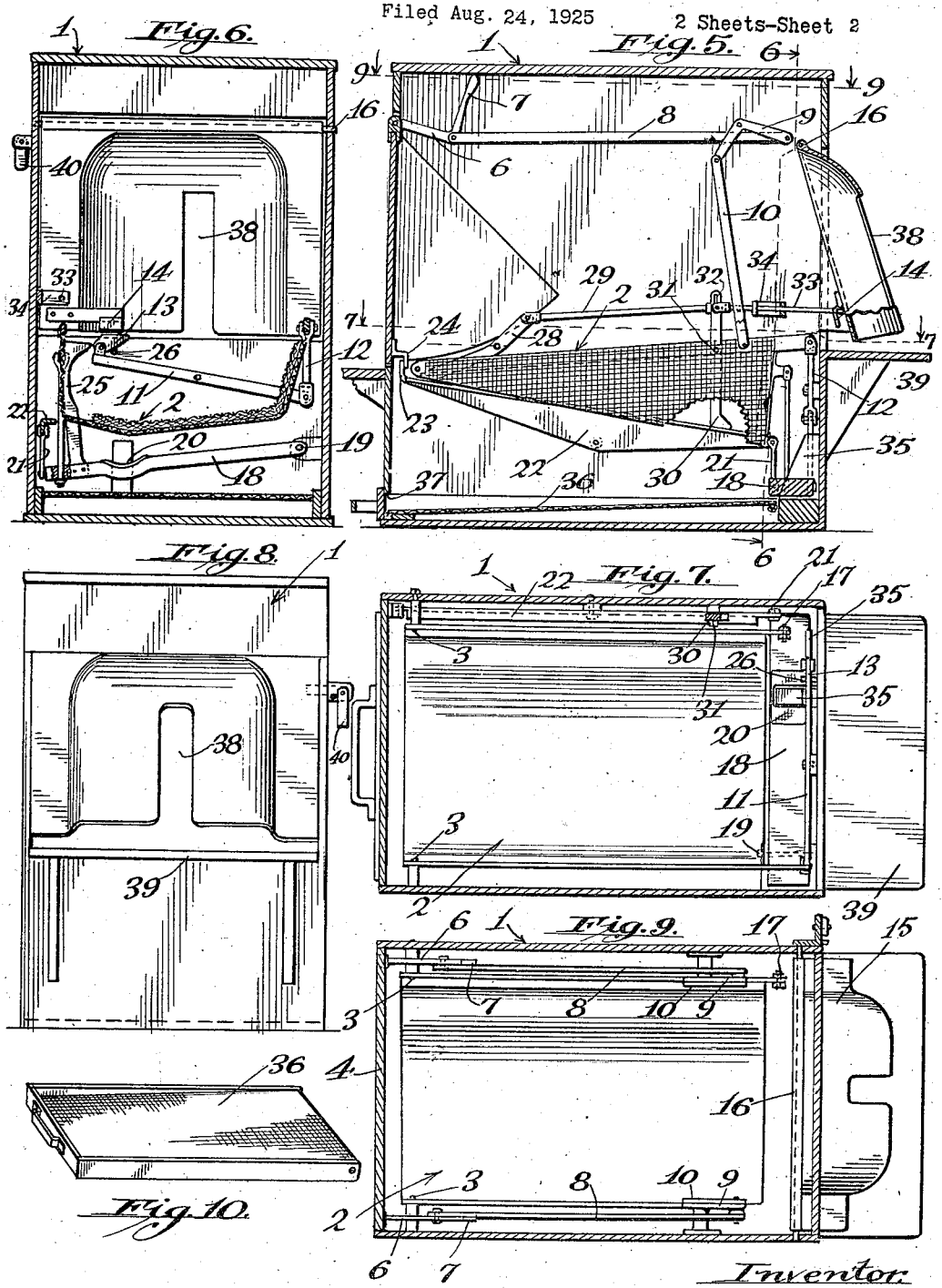

Patented Feb. 8, 1927.

1,616,661

UNITED STATES PATENT OFFICE.

FREDERICK KEYSE, OF PASADENA, CALIFORNIA.

TRAP NEST.

Application filed August 24, 1925. Serial No. 52,132.

My invention is a trap nest to permit hens to enter the nest, pass out through the same entrance if they do not lay any eggs and to pass out a rear door should they lay eggs, the front door being locked to prevent egress therethrough.

My trap nest is designed to be in part actuated by the weight of the hen walking on a pivoted nest to lower the front door and to lock the back door to prevent exit therethrough. Should the hen not lay an egg, it cannot get out by the rear door but in walking towards the front of the nest the front door is automatically opened.

The egg operated features of the nest are controlled through the weight of the egg in rolling off of the nest on to a balanced scale mechanism whereby the front door becomes locked and the rear door is forced partly open so that the hen is encouraged to leave the nest. In the meantime the egg is rolled into a basket or tray at the front of the nest in the lower portion thereof and may be readily removed at any time by the attendant.

The resetting of the nest is caused by the hen leaving through the back door, and this door swinging closed with sufficient dynamic force to reset the nest by forcing the egg scale to its normal position and unlocking and opening the front door and at the same time raising the nest to its normal position. The trap nest is thus in position for the next hen and the operation is continued for successive layings.

My invention will be more readily understood from the following description and drawings, in which:

Figure 1 is a longitudinal section on the line 1—1 of Fig. 2 in the direction of the arrows, showing the nest in its elevated position, the front door open, the rear door closed but not locked and the egg scale in its upper inoperative position.

Fig. 2 is a vertical cross section on the line 2—2 of Fig. 1 in the direction of the arrows, showing the nest and the egg scale in their uppermost position with the latch for the back door held out of engagement therewith.

Fig. 3 is a longitudinal section the same as Fig. 1 with the parts in a different position due to the nest being depressed by a hen walking thereon, thus closing the front door and locking the back door.

Fig. 4 is a vertical cross section of Fig. 3 on the line 4—4 in the direction of the arrows, showing the lock engaging the back door.

Fig. 5 is a longitudinal section similar to Fig. 3, showing the operation of the egg scales locking the front door and partially opening the back door and also indicating an egg rolling and receiving tray.

Fig. 6 is a vertical cross section of Fig. 5 on the line 6—6 in the direction of the arrows, showing the swivelling of the back door lock out of position by the egg scales.

Fig. 7 is a horizontal plan of the interior of the nest on the line 7—7 of Fig. 5 in the direction of the arrows, showing the nest and the egg rolling device at the rear end of nest.

Fig. 8 is a rear elevation of the nest showing the pivoted back door and the shelf thereon.

Fig. 9 is a horizontal plan of the interior of the nest on the line 9—9 of Fig. 5 in the direction of the arrows.

Fig. 10 is a perspective view of the egg receiving tray.

Referring particularly to Figs. 1 to 4, the nest is designated generally as a nest box 1, having opposite flat sides, flat top and bottom with flat front and back end walls, except for the doors hinged thereto and the shelves for the ingress and egress of the hens. A nest 2, preferably formed of a wire netting with suitable quilted or other like padding material, is swivelled at its front end on a pair of oppositely positioned pivots 3, secured to the opposite side walls. The nest is constructed at the sides with a suitable framing for a purpose hereafter described. The front door 4 is pivoted at 5 to an opening in the front wall of the nest box and has a bell crank lever 6 secured thereto, having a counter-weight 7 on the end of the free arm. This counter-weight is made in the form of a cup so that it may be accurately adjusted by pouring melted lead therein. Counter-weight link 8 is connected to the bell crank of the front door and connects to a free bell crank 9 at its other end, this latter being pivoted on the side wall, the free end of this bell crank connected with the nest link 10 secured at its lower end to the upper side framing of the nest.

The back door lock comprises a lever 11 pivoted in about its mid position to the back wall of the nest box and having a link 12 connected to the upper side framing of the nest at one side, this being shown as the right hand side looking from the front of the nest box. A swivelling lock 13 is pivotally connected to the other end of the lever 11 and is positioned to engage behind an angular plate 14 secured to the back door 15 which is pivotally mounted across the back of the nest box as indicated at 16.

A lifting bar 17 is attached to the end framing of the opposite side of the nest, hanging downwardly therefrom, to form a positive lift device for the egg scale as hereinafter described.

The egg scale consists of a set of carefully balanced levers and links adjacent the back wall of the box nest. An egg weighing lever 18 is pivotally mounted on one side of the box by the pivot 19 and has a slight depression 20 into which the egg rolls after rolling down the nest. The free end of the weighing lever is connected to a short vertical link 21 which attaches at its upper end to the front door locking lever 22 which is pivoted at about its mid position to one of the side walls, as shown in the drawings on the left hand side, looking from the front. This lever has an upbent end 23 adapted to engage behind an angle plate 24 on the front door 4.

When a hen enters through the open door at the front when it is in the position of Fig. 1 and walks towards the back of the nest, the weight of the hen causes the nest to swing downwardly into the position shown in Figs. 3 and 4. This action pulls down on the link 10, rocks the bell crank 9, draws on the link 8 and through the bell crank 6 closes the front door 4 and raises the counter-weight 7 into the position shown in Figs. 3 and 5. I find it desirable to have the counter-weight barely touch the top of the box nest when in this position, as it indicates if the other levers and links, etc., are in proper adjustment. This action it will be noted merely closes but does not lock the front door.

The above action of depressing the nest by the weight of the hen locks the back door by swivelling the lever 11 from the position shown in Fig. 2 to that of Fig. 4 with the lock 13 securing the door closed and locked and depressing the lifting bar 17 so that the egg scale, weighing lever 18 may operate by the weight of the egg.

After a hen has laid an egg she cannot get out of the back door on account of it being locked and is not apt to attempt to get out of the front door on account of it having only a small opening for the head and neck and being flat, whereas the rear door has a large opening and is curved to engage a hen's shoulders, encouraging it to endeavor to open the back door.

It will be noted that the nest is curved in cross section, being sharply angular at the sides with a gradual slope towards the left hand side and as the nest is tilted it will slope from front to back. Thus no matter in what part of the nest the egg is laid, it will roll transversely to the lowest portion and then roll backwardly in the nest to the rear edge thereof. It will then roll on to the depression 20, on the egg weighing lever 18. This depression is covered with padding material in order that the egg will not be broken.

The weight of the egg depresses this lever, drawing down on the link 21 and rocking the locking lever 22, thus forcing the end 23 up behind the angle plate 24 and locking the front door as shown in Fig. 5. The back door is unlocked by means of the cam bar 25 rigidly secured adjacent the free end of the weighing lever and extending upwardly to engage the lock 13 and swivel it from the position shown in Fig. 4 to that shown in Fig. 6. On account of the shape of the lock 13, when so swivelled it clears the base of the angular plate 14 and thus unlocks the back door. The lock 13 rests against a pin 26 secured to the rear wall, which in the downward movement of the lock straightens it into its upright operative position as shown in Fig. 2.

The action of the egg scale and the tilting of the locking lever 22, forces the stub end 27 of the lever 28 pivoted to the side of the box, forwardly from the position shown in Figs. 1 and 3 to that shown in Fig. 5. This action forces the link 29 rearwardly and swivels a blocking foot 30 which is pivoted at 31 to the side of the box and has a pin and slot connection 32 with the end of the link 29. The foot is brought into substantially square engagement with the rear portion of the locking lever 22 as shown in Fig. 5, from the canted position as shown in Figs. 1 and 3. A thrust rod 33 slidably mounted in a bracket 34 secured to a side wall of the nest box, thrusts the lower end of the rear door 15 outwardly from the position shown in Figs. 1 and 3 to that shown in Fig. 5.

As the egg depresses the weighing lever 18, it is subjected to the action of an egg rolling device 35 secured to the rear wall of the box, which forces the egg off the lever as shown in Fig. 5 on to the egg tray 36 which is inserted and removable through an opening 37 at the bottom of the front of the egg box. This tray is preferably constructed of canvas at an incline from the back to the front so that the egg will run to the front of the tray, leaving room for those laid subsequently.

After the egg is laid, the back door unlocked and partly opened as above described and as shown in Fig. 5, the hen is encouraged to go out by the back door and in fact cannot go out by the front door as this is locked and held locked by the foot 30 engaging the locking lever 22. The back door has an elongated slot of considerable extent 38 so the hen may readily thrust its head and neck out of the door and then step out on the shelf 39. As it hops off the shelf the back door swings closed with considerable dynamic force, striking the thrust rod 33, forcing it and the link 29 forwardly, thus swinging the blocking foot 30 from the position shown in Fig. 5 to that shown in Figs. 1 and 3 and also swinging the lever 28 and the stub end 27 to the positions so shown. This action unlocks the front door by depressing the forward end of the locking lever 22, and in addition the lifting bar 17 elevates the weighing lever 18.

This action of the lifting bar is a positive action due to the counter-weight 7, which in its movement from the position shown in Figs. 3 and 5 to that of Fig. 1, elevates the nest through the bell crank lever 6, link 8, bell crank 9 and link 10, and at the same time swings the front door open into the position shown in Fig. 1. Both these actions caused by the striking force of the back door and the action of the counter-weight are practically simultaneous although if there should be any lag, after the door is free to move, the lifting bar 17 positively elevates the egg scale mechanism to its normal position. The whole nest comprising the nest, the egg scale mechanism, the various levers and doors are now in a set position for the next hen to enter, when the operation will be repeated as above described.

It will thus be seen that my trap nest is automatic in operation so far as manual manipulation the whole action being carried through by the weight of the hen operating the nest and its associated mechanism and by the weight of the egg, actuating the egg scale and its associated mechanism. Should the poultry keeper desire to retain any of the hens in the nest, a pivoted catch 40 secured to the back of the nest box, may be swung across the edge of the back door to prevent its opening.

It is obvious that my trap nest may be considerably modified in details and in the manner in which the successive controls by weight of the hen on the nest, the egg on the egg scale and the swinging closed of the back door, operate the various features set forth above.

It is manifest that a bank of nests may be built up, having a series of partitions therebetween forming nest boxes therebetween and that my mechanism may be inserted in each nest box with a front and rear door for each nest box. This is possible on account of only using the two doors and having no mechanism extending beyond the partitions.

Having described my invention, what I claim is:

1. A trap nest comprising in combination a nest box of substantially rectangular form, a front door pivoted at its upper edge to the front of the box, a counterweight for said door, a rear door freely pivoted at its upper end at the rear of the box and having a latch, a nest having a pivotal support adjacent the front of the box and adapted to tilt downwardly at the back of the box, a bell crank pivoted on one side of the box, a link from the nest to said bell crank, a link from the bell crank operatively connected to the front door, whereby the weight of the hen in the nest closes the front door without locking same, a cross lever pivoted at the back of the box, a link connecting said lever to the nest and a swivelling lock adapted to engage the latch in the back door and lock same closed, whereby a hen may enter the nest and close the front door locking the back door, and if not laying an egg may exit through the front door unlocking the back door.

2. A trap nest as claimed in claim 1, having in addition an egg scale comprising a weighing lever pivotally mounted in the box and having means to receive an egg rolling off the nest, an angle plate forming a latch on the front door, a locking lever pivoted to one side of the box, a link connecting the weighing lever and the locking lever, means at the forward end of the locking lever to engage the latch of the front door and lock same and means operatively connected to the weighing lever to unlatch the rear door, whereby a hen on laying an egg is prevented exit at the front door and allowed exit at the back door.

3. A trap nest as claimed in claim 1, having in addition an egg scale comprising a weighing lever pivotally mounted on the box and having means to receive an egg rolling off the nest, a latch on the front door, means operated by the downward movement of the weighing lever to latch the front door, means operated by the downward movement of the weighing lever to unlatch the back door, and means operated by the downward movement of the weighing lever to partially open the back door.

4. A trap nest comprising in combination a nest box of substantially rectangular form, front and rear doors pivotally mounted on the ends thereof, a nest having a pivotal support adjacent one end of the box, a system of links and levers connected from the nest to the front door, whereby on the downward movement of the nest due to the weight of the hen entering by the front door and depressing the nest, the front door is swung closed and the back door is locked closed, an egg scale comprising a weighing lever pivotally mounted in the box and having means to receive an egg rolling off the nest, a locking lever pivoted to one side of the box, a link connecting the weighing and locking lever, means connected to the locking lever to lock the front door on the downward movement of the weighing lever, and a cam bar attached to the weighing lever and a pivoted lock engaging the back door, said cam operating the said lock to unlock the back door.

5. A trap nest comprising in combination a nest box of substantially rectangular section, a front door and a back door pivotally mounted on opposite ends to swing outwardly at their base, a nest pivotally supported adjacent the forward end of the box, said nest having a suitable frame, a bell crank lever connected to the front door, a free bell crank mounted on the side of the box, a link connecting the bell cranks and a link from the free bell crank to the framing of the nest whereby on depression of the nest the front door is swung closed.

6. A trap nest as claimed in claim 5, having in addition a lever pivoted adjacent the rear wall and having a swivelling lock attached thereto and a link from the lever to the nest framing adapted to lock the back door in its closed position on depression of the nest.

7. A trap nest as claimed in claim 5, having in addition an egg scale comprising a weighing lever pivotally supported adjacent the back wall of the nest, a locking lever pivoted adjacent the side wall of the nest, a link connecting the weighing lever and the locking lever and means on the locking lever to lock the front door closed.

8. A trap nest as claimed in claim 5, having in addition an egg scale having a weighing lever pivoted adjacent one side of the box, adapted to receive an egg rolling from the nest, a system comprising a lever and a link to lock the front door on the downward movement of the weighing lever and a cam plate attached to the weighing lever positioned to engage the swivelling lock to unlock the back door.

9. A trap nest as claimed in claim 5, having in addition means operated by the weight of the egg rolling off the nest to lock the front door of the nest in its closed position and in addition means to retain the front door locked and means operated by the closing of the back door to release said means, whereby the front door may open and the nest rise to its normal position.

10. A trap nest comprising in combination a box-like nest structure having front, back and side walls, a nest having a pivotal mounting adjacent the front of the box and extending rearwardly thereof, adapted to swing downwardly at the back of the box, said nest having an opening at the back, an egg scale having a pivotal mounting adjacent one side of the box and adapted to swing up and down across the back of the box and below the opening at the back of the nest, the scale being positioned to receive an egg rolling off the nest, means to receive an egg rolling off the scale and an egg rolling device secured to the back of the box, adapted to positively force an egg off the egg scale on depression thereof.

11. A trap nest as claimed in claim 10, having in addition a front door pivotally mounted at its upper end, a system of links and levers including a bell crank and a counter-weight connected from the nest to the front door, adapted to close the front door on depression of the nest through the weight of the hen and to open the front door and raise the nest on the hen leaving the foward end of the nest, and a lifting bar attached to the nest and operatively connected to the egg scale adapted to raise same on the elevation of the nest.

12. A trap nest as claimed in claim 10, having in addition a front door pivotally mounted at its upper end, a back door pivotally mounted at its upper end, a system of links and levers including a bell crank and a counterweight connecting the nest and the front door, latches on both doors, said system of links and levers closing the front door but not latching same on depression of the nest, means to lock the back door on depression of the nest, means to lock the front door on depression of the egg scale, means to unlock the back door on depression of the egg scale, and means to partially open the back door on depression of the egg scale.

13. A trap nest comprising in combination a box-like nest structure, a pivotally mounted nest adapted to swing downwardly at the back of the box, a pivotally mounted egg scale positioned to receive an egg rolling off the nest, a tray inserted through the front of the box at the base thereof, positioned to receive an egg rolling off the egg scale during the downward movement of such scale, a front and a back door, operative mechanism connected with the nest to close the front door and lock the back door in its closed position, an operative device connected to the egg scale to lock the front door, unlock the back door and in addition means to partially open the back door, said latter means being operatively engaged by the swinging closed of the back door to release the locking of the front door, allowing the front door to open and the nest and the egg scale to return to its normal position.

14. A trap nest comprising in combination a box-like structure housing a nest, a front door forming an entrance, a back door freely suspended on a horizontal pivot to close by its own weight, forming an exit, a nest movably mounted in the box, means operated by the movement of the nest through the weight of a hen to close the front door, latching and unlatching means operated by such movement of the nest to latch the back door closed, means to open the front door and to elevate the nest permitting exit of a non-laying hen through the front door, said latching and unlatching means being operated by the return movement of the nest to unlatch the back door independent of the laying of an egg on a non-laying hen leaving the nest through the front door.

15. A trap nest having a box-like structure with a nest therein, a front door forming an entrance and a back door forming an exit, a movable nest in the box and a movable egg receiving device in the box, means operated by the nest to close the front door but not latch same and to latch the back door, means operated by the egg receiving device to latch the front door, means operated by the egg receiving device to unlatch the back door, and means operated by the egg receiving device to partially open the back door.

In testimony whereof I have signed my name to this specification.

FREDERICK KEYSE.